(12) United States Patent
Ito

(10) Patent No.: US 7,202,922 B2
(45) Date of Patent: Apr. 10, 2007

(54) POLARIZING PLATE, AND LIQUID CRYSTAL DISPLAY

(75) Inventor: Yoji Ito, Minami-Ashigara (JP)

(73) Assignee: Fuji Photo Film Co., Ltd., Minami-Ashigara-shi, Kanagawa (JP)

( * ) Notice: Subject to any disclaimer, the term of this patent is extended or adjusted under 35 U.S.C. 154(b) by 56 days.

(21) Appl. No.: 10/508,853

(22) PCT Filed: Mar. 19, 2003

(86) PCT No.: PCT/JP03/03358

§ 371 (c)(1),
(2), (4) Date: Sep. 24, 2004

(87) PCT Pub. No.: WO03/081322

PCT Pub. Date: Oct. 2, 2003

(65) Prior Publication Data

US 2005/0117090 A1     Jun. 2, 2005

(30) Foreign Application Priority Data

Mar. 26, 2002    (JP) .............................. 2002-085868

(51) Int. Cl.
*G02F 1/1335*     (2006.01)

(52) U.S. Cl. ........................................ 349/96; 349/119

(58) Field of Classification Search ................ 349/119, 349/96
See application file for complete search history.

(56) References Cited

U.S. PATENT DOCUMENTS

| | | | |
|---|---|---|---|
| 5,568,290 A | | 10/1996 | Nakamura |
| 6,404,469 B1 | * | 6/2002 | Kitagawa et al. ............. 349/96 |
| 6,778,242 B1 | * | 8/2004 | Murayama et al. ......... 349/117 |
| 6,888,592 B2 | * | 5/2005 | Kitagawa et al. ............. 349/96 |
| 6,937,307 B1 | * | 8/2005 | Ito et al. .................... 349/117 |

FOREIGN PATENT DOCUMENTS

| | | |
|---|---|---|
| EP | 0 911 656 A2 | 4/1999 |
| JP | 64-68940 | 3/1989 |
| JP | 7-191217 | 7/1995 |
| JP | 8-50206 | 2/1996 |

OTHER PUBLICATIONS

Yuri Bobrov, "Lyotropic Thin Film Polarizers", 2000, SID, pp. 1102-1105.*

* cited by examiner

*Primary Examiner*—Toan Ton
(74) *Attorney, Agent, or Firm*—Buchanan Ingersoll & Rooney PC

(57) ABSTRACT

A polarizing plate is provided which includes a polymer film, a polarizer, a polymer substrate, and an optically anisotropic layer containing a liquid crystal compound, laminated in this order, wherein the polarizer has a thickness of 10 to 25 μm. A liquid crystal display using the polarizing plate shows high display quality without causing light leakage.

9 Claims, No Drawings

POLARIZING PLATE, AND LIQUID CRYSTAL DISPLAY

TECHNICAL FIELD

The present invention relates to a polarizing plate, and a liquid crystal display using the polarizing plate.

BACKGROUND ART

Liquid crystal display is constituted of a polarizing plate and a liquid crystal cell.

The most widely used TFT liquid crystal display of TN-mode has an optical compensation film inserted between the polarizing plate and the liquid crystal cell to realize a high display quality of the liquid crystal display as described in JP-A-8-50206. However, such a display has the disadvantage that the thickness of the liquid crystal display itself increases.

JP-A-1-68940 describes that use of an elliptic polarizing plate having a retardation film on one side of a polarizer and a protective film on the other side thereof improves frontface contrast of the liquid display without increasing the thickness thereof. However, it was apparent that the retardation film (optical compensation film) of the invention disclosed in JP-A-1-68940 is liable to cause retardation by thermal strain or other causes, and thus has the problem on durability. This retardation causes framelike light leakage (increase of transmittance) to deteriorate the display quality of the liquid crystal display.

To suppress occurrence of the retardation by strain, JP-A-7-191217 and EP-0911656A2 directly use an optical compensation film formed by applying an optical anisotropic layer comprising a discotic compound on a transparent support as a protective film for the polarizing plate, thereby solving the above-described problems on the durability without increasing thickness of the liquid crystal display.

However, it was found that when the polarizing plate using the optical compensation film as the protective film was set on a large panel of 17-inch or larger, it is impossible to completely prevent the light leakage caused by the thermal strain. The optical compensation film should have not only the function of compensating optically the liquid cell but also sufficient durability against change of service environments.

DISCLOSURE OF THE INVENTION

One object of the present invention is to optically compensate a liquid crystal cell by using an optical compensation sheet.

Another object of the present invention is to provide a liquid crystal display giving high quality display without light leakage by using an optical compensation sheet placed on one side of a polarizer.

Still another object of the present invention is to remarkably improve the production yield of the polarizing plate.

An optical anisotropic layer formed from a liquid crystal compound is used for optically compensating a liquid crystal cell. Generally, the optical anisotropic layer is provided on a polymer substrate (optical compensation film), and a polarizer is interposed between the optical compensation film and a triacetylcellulose film as a protective film.

When the optical compensation sheet is used in a liquid crystal display, the optical compensation sheet used in a liquid crystal display is usually fixed to a liquid crystal cell or the like using a pressure-sensitive adhesive or the like. Therefore, the strain produced by expansion or contraction of a polymer film of the optical compensation sheet is retained in the entire of the optical compensation sheet, changing the optical properties of the polymer film.

Changes of the optical properties have conventionally been considered to be mainly resulted from the following causes. One cause is variation of humidity and temperature conditions in the service environment of the liquid crystal display, resulting in expansion or contraction of the polymer film to give change of the optical properties of the optical compensation sheet. Another cause is nonuniform temperature distribution in the plane of the optical compensation sheet resulting from backlight illumination or the like of the liquid crystal display, resulting in thermal strain to give change of the optical properties of the optical compensation sheet.

In particular, it is known that the polymers having hydroxyl groups such as cellulose esters are greatly influenced by environmental conditions.

Therefore, it has hitherto been believed that the light leakage can be prevented by suppressing the variation of the optical properties of the optical compensation sheet under the environmental conditions, and uniformizing the temperature distribution in the optical compensation sheet.

As a result of extensive investigations by the present inventors, an important cause has been found on the variation of the optical properties of the optical compensation sheet under environmental conditions.

Generally, a polarizing plate comprises a pair of protective films and a polarizer comprising PVA as a main component. It has been found that PVA used in the polarizer causes the largest dimensional change due to variation of humidity and temperature in the service environment of the liquid crystal display. In particular, in a practical liquid crystal display, since the polarizing plate is bonded to a liquid crystal cell through a pressure-sensitive adhesive, the dimensional change caused by the environment is transmitted as deformation stress to the protective film (i.e., optical compensation sheet). This stress will cause variation of the optical properties of the protective film.

Accordingly, it has been found that the strain caused by environment can be reduced by decreasing the stress ((strain)×(sectional area)×(elasticity modulus)) due to the dimensional change of the polarizer, specifically by decreasing the thickness, and that the light leakage can remarkably be reduced by decreasing the elastic modulus.

The objects of the present invention have been achieved by the polarizer and the liquid crystal display described below.

(1) A polarizing plate comprising a polymer film, a polarizer, a polymer substrate, and an optically anisotropic layer formed of a liquid crystal compound, laminated in this order, wherein the polarizer has a thickness of 10 to 25 µm.

(2) The polarizing plate described in the above item (1), wherein the polymer substrate has a thickness of 30 to 70 µm.

(3) The polarizing plate described in the above item (1) or (2), wherein the polymer film comprises cellulose acetate.

(4) The polarizing plate described in the above items (1) to (3), wherein the polymer substrate comprises cellulose acetate.

(5) The polarizing plate described in the above items (1) to (4), wherein the liquid crystal compound used in the optical anisotropic layer is a discotic liquid crystal compound, the plane of the discotic structural units is inclined relative to the surface of the polymer substrate, and the angle between the plane of the discotic structural units and the surface of the polymer substrate changes in the direction of the depth of the optically anisotropic layer.

(6) A liquid crystal display comprising a liquid crystal cell, and two polarizing plates placed on both sides of the liquid crystal cell, wherein at least one polarizing plate is the polarizing plate described in items (1) to (5).

(7) The liquid crystal display described in the above item (6), wherein the liquid crystal cell is of an OCB mode, a VA mode, or a TN mode.

BEST MODE FOR CARRYING OUT THE INVENTION

The polarizing plate of the present invention has one characteristic in that a polarizer used therein has a thickness of 10 to 25 μm.

Polarizer:

The polarizer of the present invention comprises a binder, and iodine or a dichroic dyestuff.

The iodine and the dichroic dyestuff in the present invention are oriented in the binder, whereby the polarizing plate of the present invention exhibits the polarizing performance. The iodine and the dichroic dyestuff are oriented along the binder molecules.

The polarizer is prepared by immersing a stretched polymer in a bath containing iodine or a dichroic dyestuff to permeate the iodine or the dichroic in the binder.

In a commercially available polarizer, the iodine or the dichroic dyestuff is distributed in the regions of about 4 μm inside from the polymer surfaces (about 8 μm in total on the both sides). Therefore, a thickness of at least 10 μm is necessary to obtain a sufficient polarizing performance. The degree of permeation can be controlled by the concentration of the dissolved iodine or dichroic dyestuff, the bath temperature, and the immersion time.

The lower limit of the thickness of the binder in the present invention is preferably at least 10 μm from the above-described reasons. The upper limit of the thickness is preferably as small as possible in view of the light leakage of the liquid crystal display, and the thickness should be not more than that of the commercially available polarizing plate (about 30 μm), preferably 25 μm or less. The light leakage can be prevented in a 17-inch liquid crystal display by decreasing the thickness to 20 μm or less.

The binder used is not particularly limited, and may be a self-crosslinkable polymer, or may be a binder crosslinkable by a crosslinking agent. The binder layer can be formed by reaction between binder molecules having a functional group or having an introduced functional group, under action of light, heat, pH change, or the like; or by introducing bonding groups between binders using a crosslinking agent that is a compound having high reactivity, and crosslinking the binders.

The crosslinking can be conducted by applying a coating liquid containing the binder or a mixture of the binder and a crosslinking agent to a transparent support, and then heating or the like. The crosslinking treatment may be conducted in any stage until obtaining the final polarizer so long as the durability can be secured at the stage of final commercial article.

The binder used in the present invention can be either a self-crosslinkable polymer or a polymer crosslinkable by a crosslinking agent. Of course, there are binders self-crosslinkable and also crosslinkable by a crosslinking agent. Examples of the binders include polymers such as polym-ethyl methacrylate, acrylic acid/methacrylic acid copolymers, styrene/maleimide copolymers, polyvinyl alcohols, modified polyvinyl alcohols, poly(N-methylol-acrylamide), styrene/vinyltoluene copolymers, chlorosulfonated polyethylene, nitrocellulose, polyvinyl chloride, chlorinated polyolefins, polyesters, polyimides, vinyl acetate/vinyl chloride copolymers, ethylene/vinyl acetate copolymers, carboxymethylcellulose, polyethylene, polypropylene, and polycarbonate; and compounds such as silane coupling agents. Examples of the polymers preferably are water-soluble polymers such as poly(N-methylolacrylamide), carboxymethylcellulose, gelatin, polyvinyl alcohol, and modified polyvinyl alcohol. Of those, gelatin, polyvinyl alcohol, and modified polyvinyl alcohol are more preferable, and polyvinyl alcohol and modified polyvinyl alcohol are especially preferable.

Of the above binders, polyvinyl alcohols and modified polyvinyl alcohols are preferable. The polyvinyl alcohol has, for example, a degree of saponification of 70 to 100%, preferably 80 to 100%, and more preferably 95% or more, and has a degree of polymerization in range of preferably 100 to 5,000. Examples of the modified polyvinyl alcohol include the ones modified by copolymerization (the modifying groups including COONa, $Si(OH)_3$, $N(CH_3)_3C_1$, $C_9H_{19}COO$, $SO_3Na$, and $C_{12}H_{25}$), the ones modified by chain transfer (the modifying groups including COONa, SH, and $C_{12}H_{25}$), and the ones modified by block polymerization (the modifying groups including COOH, $CONH_2$, COOR (alkyl), and $C_6H_5$). The modified polyvinyl alcohol preferably has a degree of polymerization of 100–3,000. Of those, unmodified and modified polyvinyl alcohols having a degree of saponification of 80 to 100% are preferable, and unmodified and alkylthio-modified polyvinyl alcohols having a degree of saponification of 85 to 95% are more preferable.

The polyvinyl alcohol or the modified polyvinyl alcohols used in the binder layer may be used alone or in combination of two or more thereof.

Compounds disclosed in JP-A-8-338913, JP-A-9-152509, and JP-A-9-316127 are particularly preferably used as the modified polyvinyl alcohol.

The crosslinking agent for the binder is not particularly limited. A larger addition amount of the crosslinking agent tends to give more improvement in resistance to high humidity and high temperature. However, addition of the crosslinking agent in an amount of 50 mass % or more, based on the binder, lowers the orientation property of the iodine or the dichroic dyestuff. Therefore, the addition amount is preferably 0.1 to 20 mass %, more preferably 0.5 to 15 mass %. The alignment film of the present invention contains unreacted crosslinking agent to some extent after completion of the crosslinking reaction. The amount of the remaining crosslinking agent is preferably 1.0 mass % or less, more preferably 0.5 mass % or less. If the crosslinking agent is contained in an amount of more than 1.0 mass % in the binder layer, sufficient durability cannot be achieved. Specifically, when such an alignment film is used in a liquid crystal display, deterioration of the polarization performance may occur during long-term service, or long-term storage under high temperature and high humidity atmosphere.

The specific examples of the crosslinking agent are disclosed in U.S. Re. Pat. No. 23,297. Of those, boric acids (boron, and borax) are preferably used.

Iodine and Dichroic Dyestuff:

The dichroic molecule includes dyestuff compounds such as azo dyestuffs, stilbene dyestuffs, pyrazolone dyestuffs, triphenylmethane dyestuffs, quinoline dyestuffs, oxazine dyestuffs, thiazine dyestuffs, and anthraquinone dyestuffs. The dyestuff is preferably water-soluble, but is not limited thereto. These dichroic molecules have preferably a hydrophilic substituent introduced thereto, such as a sulfonic acid group, an amino group, and a hydroxyl group. Examples of the dichroic molecule include C.I. Direct Yellow 12, C.I. Direct Orange 39, C.I. Direct Orange 72, C.I. Direct Red 39, C.I. Direct Red 79, C.I. Direct Red 81, C.I. Direct 83, C.I. Direct 89, C.I. Direct Violet 48, C.I. Direct Blue 67, C.I. Direct Blue 90, C.I. Direct Green 59, and C.I. Acid Red 37; and dyestuffs disclosed in JP-A-1-161202, JP-A-1-172906, JP-A-1-172907, JP-A-1-183602, JP-A-1-248105, JP-A-1-265205, and JP-A-7-261024. Such dichroic molecules are used in a form of a free acid, or a salt such as an alkali metal salt, an ammonium salt, and an amine salt. Polarizers having various color tones can be prepared by blending two or more of the dichroic molelcules. The compounds (dyestuffs) which give a black color when the polarization axises of polarizing elements or polarizing plates are placed perpendicularly, and blends of two or more kinds of dichroic molecules which give black color are preferred because of excellent single plate high transmittance and degree of polarization.

From the standpoint of increasing the contrast ratio of the liquid crystal display, the transmittance of the polarizing plate is preferably higher, and the degree of polarization thereof is preferably higher. The transmittance of the polarizing plate is in a range of preferably 30 to 50%, more preferably 35 to 50%, most preferably 40 to 50%, at a light wavelength of 550 nm. The degree of polarization is in a range of preferably 90 to 100%, more preferably 95 to 100%, most preferably 99 to 100%, at a light wavelength of 550 nm.

The transmittance of the polarizing plate can be increased by increasing the transmittance of the polymer film as described later, or by adjusting the refractive index of the adhesive bonding the polarizer and the polymer film.

The transmittance of the polymer film as described later can be increased by decreasing the film thickness or lowering the haze of the film.

The adhesive for bonding the polarizer and the polymer film together, or the polarizer and the optically anisotropic layer together, is not particularly limited. Examples of the adhesive include PVA type resins (including PVA modified by a group of acetoacetyl, sulfo, carboxyl, oxyalkylene, etc.) and aqueous solution of boron compounds. Of those, PVA type resins are preferred. The thickness of the adhesive is in a range of preferably 0.01 to 10 μm, more preferably 0.05 to 5 μm, after drying.

The refractive index of the adhesive is preferably close to that of cellulose acetate film. The difference in the refractive index between the adhesive and the cellulose acetate film is preferably 0.1 or smaller, more preferably 0.05 or smaller, most preferably 0.01 or smaller.

The polymer film and the polymer substrate for interposing the polarizer of the present invention therebetween are explained below.

Polymer Film and Polymer Substrate:

The polymer film used preferably has light transmittance of 80% or more. Examples of the polymer for constituting the film include cellulose esters (e.g., cellulose acetate, and cellulose diacetate), norbornene type polymers, and polymethyl methacrylate. Commercially available polymers may also be used (Artone, and Zeonex as the norbornene type polymer). Cellulose esters are preferable, and lower fatty acid esters of cellulose are more preferable. The term "lower fatty acid" used herein means a fatty acid having 6 or less carbon atoms. Of those, the carbon atom number is preferably 2 (cellulose acetate), 3 (cellulose propionate), or 4 (cellulose butyrate). Of those, cellulose acetate is particularly preferred. Mixed fatty acid esters such as cellulose acetate propionate, and cellulose acetate butyrate may be used.

Even conventional polymers that are liable to develop birefringence, such as polycarbonate or polysulfone, can be used by suppressing the tendency by modifying the molecule as described in the patent specification of WO 00/26705.

Cellulose acetate having an acetic acid content of 55.0 to 62.5%, preferably 57.0 to 62.0% is preferably used as the polymer film.

The term "acetic acid content" used herein means an amount of bonded acetic acid to a unit mass of cellulose. The acetic acid content is measured and calculated according to ASTM: D-817-91 (Method of Testing Cellulose Acetate).

The viscosity-average degree of polymerization (DP) of the cellulose ester is preferably 250 or more, more preferably 290 or more. The cellulose ester used in the present invention has preferably narrower molecular weight distribution, Mw/Mn (Mw: mass-average molecular weight, Mn: number-average molecular weight), as measured by gel permeation chromatography. Specifically, the value of Mw/Mn is in a range of preferably 1.0 to 1.7, more preferably 1.3 to 1.65, most preferably 1.4 to 1.6.

In the cellulose ester, hydroxyl groups at 2-, 3-, and 6-positions are not uniformly esterified respectively at ⅓ of the entire substitution. The degree of substitution tends to decrease at the 6-position. In the present invention, the degree of substitution is preferably higher at the 6-position than at the 2- and 3-positions.

Specifically, the proportion of substitution of the hydroxyl at 6-position accounts for preferably 30–40% of the entire substitution; more preferably 31% or more, most preferably 32% or more. The degree of substitution at the 6-position is preferably 0.88 or more.

The hydroxyl at the 6-position may be substituted by an acyl group having 3 or more carbon numbers other than acetyl (e.g., propionyl, butyryl, valeryl, benzoyl, and acryloyl). The degree of substitution of the respective positions can be measured by NMR.

The cellulose ester having hydroxyl groups at 6-position substituted at a higher degree of substitution can be synthesized by reference to the methods described in JP-A-11-5851, paragraphs 0043–0044, Synthesis Example 1; paragraphs 0048–0049, Synthesis Example 2; and paragraphs 0051–0052, Synthesis Example 3.

The cellulose acetate film can be produced from the prepared cellulose acetate solution (dope) by a solvent cast method. The dope contains preferably a retardation-increasing agent.

The film is formed by casting the dope onto a drum or a band and evaporating the solvent. The dope for the casting is preferably adjusted to have a solid concentration of 18–35%. The surface of the drum or band is preferably finished in a mirror state. The casting and drying methods in the solvent casting method are disclosed in U.S. Pat. Nos. 2,336,310, 2,367,603, 2,492,078, 2,492,977, 2,492,978, 2,607,704, 2,739,069, and 2,739,070; British Patents 640731, and 736892; JP-B 45-4554, and 49-5614 and JP-A 60-176834, 60-203430, and 62-115035.

The dope is cast preferably onto a drum or band having a surface temperature of preferably 10° C. or lower. After casting, the dope thus cast is dried by air stream preferably for 2 seconds or longer. The obtained film is stripped off from the drum or band. The film may be further dried by a hot air stream at successively raised temperatures of from 100 to 160° C. to evaporate the remaining solvent. The above method is described in JP-B-5-17844. By this method, the time from the casting to the peeling can be shortened. For conducting this method, the dope should gel at the surface temperature of the drum or band during casting.

The film may be formed by casting a prepared cellulose acetate solution (dope) in two or more layers. The dope is cast onto a drum or band and the solvent is evaporated to form a film. The dope for the casting is preferably adjusted to have a solid matter concentration of 10–40%. The surface of the drum or band is preferably finished in a mirror state.

In the case where two or more cellulose acetate solutions are cast, the cellulose acetate-containing solutions may be cast respectively through plural casting dies placed at intervals along the support movement direction to form layers. Such a lamination can be conducted according the method disclosed in, for example, JP-A-61-158414, JP-A-1-122419, and JP-A-11-198285. The cellulose acetate solution may be cast through two casting dies to form a film by a method shown in, for example, JP-B-60-27562; and JP-A-61-947244, 61-947245, 61-104813, 61-158413, and 6-134933. Another casting method of the cellulose acetate film may be used in which a flow of a high-viscosity cellulose acetate solution is enveloped with a low-viscosity cellulose acetate solution and the cellulose acetate solutions are simultaneously extruded.

In forming an optically anisotropic layer comprising a liquid crystal compound on a polymer film, it is preferable to control the retardation of the polymer film (herein, a polymer substrate).

Retardation of Polymer Substrate:

The preferred range of the retardation of the polymer substrate depends on the kind of the liquid crystal cell using the optical compensation film and the use manner thereof. It is preferable in the present invention that the Re retardation value is controlled to a range of 20 to 70 nm, and the Rth retardation value is controlled to a range of 70 to 400 nm.

In the case using two optically anisotropic layers in a liquid crystal display, it is preferable that the Rth retardation value of the substrate is controlled to a range of 70 to 250 nm.

In the case of using one optically anisotropic layer in a liquid crystal display, it is preferable that the Rth retardation value of the substrate is controlled to a range of 150 to 400 nm.

The birefringent index ($\Delta n$: nx−ny) of the substrate is preferably in a range of 0.00028 to 0.020. The birefringent index in the thickness direction $\{(nx+ny)/2-nz\}$ of the cellulose acetate film is preferably in a range of 0.001 to 0.04.

Retardation-Increasing Agent:

For adjusting the retardation of the polymer film, an aromatic compound having at least two aromatic rings is preferably used as a retardation-increasing agent.

Hereinafter, cellulose acetate, as one example, is explained in detail which is the best embodiment of the polymer film.

The aromatic compound is used in an amount of 0.01–20 parts by mass, preferably 0.05 to 15 parts by mass, and more preferably 0.1 to 10 parts by mass, per 100 parts by mass of cellulose acetate. Two or more aromatic compounds may be used in combination.

The aromatic ring of the aromatic compound includes aromatic hydrocarbon rings as well as aromatic heterocyclic rings.

Six-membered rings (i.e., benzene ring) are particularly preferred as the aromatic hydrocarbon ring.

The aromatic heterocyclic rings are generally unsaturated rings. The aromatic heterocyclic ring is preferably a five-memberd ring, a six-membered ring, or a seven-membered ring, more preferably a five-membered ring or a six-membered ring. The aromatic heterocyclic ring has generally the maximum number of double bonds. The heteroatom is preferably nitrogen atom, oxygen atom, or sulfur atom; particularly nitrogen atom. The aromatic heteroyclic ring includes furan rings, thiophene rings, pyrrole rings, oxazole rings, isoxazole rings, thiazole rings, isothiazole rings, imidazole rings, pyrazole rings, furazan rings, triazole rings, pyran rings, pyridine rings, pyridazine rings, pyrimidine rings, pyrazine rings, and 1,3,5-triazine rings.

Preferable aromatic rings are benzene rings, furan rings, thiophene rings, pyrrole rings, oxazole rings, thiazole rings, imidazole rings, triazole rings, pyridine rings, pyrimidine rings, pyrazine rings, and 1,3,5-trizine rings: particularly preferred are benzene rings and 1,3,5-triazine rings.

The aromatic compound has preferably at least one 1,3,5-triazine ring.

The aromatic compound has preferably 2–20 aromatic rings, more preferably 2–12 aromatic rings, further preferably 2–8 aromatic rings, most preferably 2–6 aromatic rings.

Two aromatic rings are linkable by (a) formation of a condensed ring, (b) direct bonding by a single bond, or (c) linkage by a linking group (spiro bonding cannot be formed due to aromatic rings). The rings may be linked in any of the above manners (a) to (c).

Such retardation-increasing agents are described in, for example, WO 01/88574A1, WO 00/2619A1, JP-A-2000-111914, and JP-A-2000-275434.

The retardation of the cellulose acetate film can also be adjusted by stretching treatment. The stretch ratio is preferably in a range of 3 to 100%. The stretching of the cellulose acetate in the present invention is preferably conducted by tenter stretching. For fine control of the phase retarding axis, the difference in the tenter-clipping rates at the both sides and the release timing is preferably minimized. The stretching treatment can be conducted according to WO-01/88574A1, page 37, line 8 to page 38, line 8.

Surface Treatment of Cellulose Acetate Film:

The cellulose acetate film is preferably subjected to a surface treatment. The treatment specifically includes corona discharge treatment, glow discharge treatment, flame treatment, acid treatment, alkali treatment, and UV irradiation treatment. An under-coating layer is preferably provided as described in JP-A-7-333433.

In the above treatment, the temperature of the cellulose acetate film should be Tg (glass transition temperature) or lower, specifically 150° C., from the standpoint of maintaining the flatness of the film.

The surface treatment of the cellulose acetate is preferable an acid treatment or an alkali treatment, namely saponification treatment, from the standpoint of adhesiveness to the polarizer.

The surface energy is preferably 55 mN/m or more, more preferably in a range of 60 to 75 mN/m. The alkali saponification treatment is specifically explained below as an example.

The alkali saponification treatment is preferably conducted by the cycle of immersion of the film surface into an alkali solution, neutralization with an acid solution, washing with water, and drying.

The alkali solution includes a potassium hydroxide solution, and a sodium hydroxide solution. The hydroxyl ion concentration thereof is in a range of preferably 0.1 to 3.0N, more preferably 0.5 to 2.0N. The temperature of the alkali solution is in a range of preferably from room temperature to 90° C., more preferably 40 to 70° C.

The surface energy of a solid can be measured by a contact angle method, a wetting heat method, or an adsorption method as described in the literature "Nure no Kiso to Ouyou (Wetting: Elements and Applications)" (Riaraizu K. K., 1989.12.10). The surface energy of the cellulose acetate film of the present invention is preferably measured by the contact angle method.

Specifically, two kinds of liquids having respectively a known surface energy are dropped onto the cellulose acetate film, and the contact angles are measured. The contact angle is an angle between the surface of the film and the tangent to the liquid drop at the crossing point of the drop surface and the film surface at the liquid drop side. The surface energy of the film is calculated from the measured contact angles.

Optically Anisotropic Layer Comprising Liquid Crystalline Compound:

The surface of the support of the polarizing plate of the present invention can be provided with a functional layer such as an optically anisotropic layer for compensation of the visual field angle of LCD as described in JP-A-4-229828, JP-A-6-75115, JP-A-8-50206, etc.; a glare-preventing or reflection-preventing layer for visibility improvement of display; a PS wave-separating layer for LCD luminance improvement against anisotropic scattering and anisotropically optical interference (polymer dispersion liquid crystal layer, cholesteric liquid crystal layer, etc.); a hard coat layer for scratch resistance of the polarizing plate; a gas barrier layer for preventing diffusion of moisture or oxygen; an adhesion-promoting layer for strengthening the contact of the polarizer with an adhesive or a pressure-sensitive adhesive; slipping-imparting layer; and so forth.

The functional layer may be provided on the side of the polarizer, or may be provided on the side opposite the polarizer, depending on the object.

Various functional films as a protective film can directly be bonded to one or both faces of the polarizer of the present invention. Examples of the functional film include retardation films such as a λ/4 plate, and λ/2 plate; a light-diffusing film; a plastic cell having an electroconductive layer on the face opposite the polarizing plate; a luminance-improving film having a function of anisotropic scattering or anisotropically optical interference; a reflective film; and a semi-transparent reflective plate.

The polarizing plate of the present invention exhibits its function more effectively by combining with a coat type of optical member (e.g., an optical compensation film, and a luminance-improving film), thereby controlling the transmission axis of the polarizing plate and the retardation axis of the respective optical members. As specific examples of the coat type optical member, optical compensating sheets using discotic liquid crystal molecules are described in, for example, JP-A-6-214116, U.S. Pat. No. 5,583,679, U.S. Pat. No. 5,646,703, and German Patent 3911620A1; optical compensating sheet using rod-shaped liquid crystalline molecules are described in, for example, JP-A-7-35924; and a luminance-improving film is described in, for example, JP-A-11-149015.

A preferable embodiment of the anisotropically optical layer comprising the liquid crystal compound of the present invention is described in detail below.

An alignment film is preferably provided between the polymer substrate and the optically anisotropic layer. The alignment film functions to align the liquid crystal compound of the present invention in a constant direction. The alignment film is essential to realize the preferred embodiment of the present invention. However, after orientation of the liquid crystal compound and fixation of the aligned state, the alignment film is not essential as the structural element of the present invention because the alignment film plays its role. Therefore, the polarizing plate of the present invention can be prepared by transferring only the optically anisotropic layer on the alignment film having the fixed aligning state to the polarizer.

Alignment film:

The alignment film has a function to define the orienting direction of the liquid crystal compound. The alignment film can be formed in various methods such as a rubbing treatment of an organic compound (preferably a polymer); oblique deposition of an inorganic compound; formation of a layer containing microgrooves; and building-up of an organic compound (e.g., ω-tricosanoic acid, dioctadecylmethylammonium chloride, and methyl stearate) by a Langmuir-Blodgett technique (LB film). Other alignment films are known in which an orienting function is imparted by application of an electric field, application of a magnetic field, or irradiation of light. The alignment film is preferably formed by rubbing treatment of a polymer.

The alignment film is preferably formed by rubbing treatment of a polymer. Polyvinyl alcohol is preferred as the polymer. Modified polyvinyl alcohols having hydrophobic groups bonded thereto are particularly preferred.

The alignment film is described in, for example, WO 01/88574A1, page 43 line 24 to page 49, line 8.

Optically Anisotropic Layer:

The optically anisotropic layer formed from a liquid crystal compound is preferably prepared on an alignment film provided on a polymer substrate in the present invention.

The liquid crystal compound used for the optically anisotropic layer includes rod-like liquid crystal compounds and discotic liquid crystal compounds. The rod-like liquid crystal compounds and discotic liquid crystal compounds may be a polymeric liquid crystal or a low-molecular liquid crystal. The liquid crystal compound also includes low-molecular liquid crystals in which the liquid crystallinity has been lost by crosslinking.

The optically anisotropic layer can be formed by applying a coating liquid containing a liquid crystal compound and optionally a polymerization initiator or another component to an alignment film.

In the case of using a discotic liquid crystal compound, it is preferable that the plane of the discotic structural units is inclined relative to the polymer substrate, and the angle between the plane of the discotic structural unit and the surface of the polymer substrate varies in the depth direction of the optically anisotropic layer.

The angle (inclined angle) of the plane of the discotic structural units is generally increased or decreased depending on the distance from the bottom face of the optically anisotropic layer in the depth direction of the optically anisotropic layer. The inclined angle is preferably increased with increase of the distance. The change of the inclined angle may be continuous increase, continuous decrease, intermittent increase, intermittent decrease, combination of continuous increase and continuous decrease, or intermittent change including increase and decrease. The intermittent change includes a region in which the inclined angle does not change in the course of the thickness direction. Even in the case where no angle-change region is contained in the layer, the inclined angle is preferably increased or decreased as a whole. More preferably, the inclined angle is increased as a whole, and still more preferably the change is continuous.

The optically anisotropic layer is described in WO 01/88574A1, page 49, line 10 to page 67, line 20 as the reference.

Polarizer Having No Transmission Axis in Length Direction and in Width Direction:

The polarizer of the present invention is prepared by stretching a raw film in a direction inclined to the length direction at an angle of 10 to 80° (stretching method), or rubbing the film (rubbing method), and then dyeing the film with iodine or a dichroic dyestuff. Stretching is conducted such that this inclined angle is made equal to the angle between the transmission axis of the two polarizing plates bonded to a liquid crystal cell of LCD and the vertical or lateral direction of the liquid crystal cell.

Usually, this angle is 45°. However, in new models of the transmission type LCD, the reflection type LCD, the semi-transmission type LCD, and the like, the angle is not necessarily 45°. The stretch direction is adjusted suitably in accordance with the design of the LCD.

In the stretching method, the stretch ratio is preferably 2.5 to 30.0, more preferably 3.0 to 10.0. The stretching may be conducted by dry stretching in the air or by wet stretching in water. The stretch ratio is about 2.5 to 5.0 in dry stretching, and about 3.0 to 10.0 in wet etching. This oblique stretching may be conducted fractionally in plural times. The fractional stretching enables uniform stretching even in a high stretch ratio. Before the oblique stretching, slight stretching may be conducted in the width direction or the length direction (to an extent to prevent the contraction in the width direction).

In the stretching, the tenter stretching for biaxial stretching in usual film molding may be conducted differently in the right side and the left side. That is, the stretching is conducted at different speeds at the left side and the right side. For such differential stretching, the thickness of the binder film before the stretching is necessarily made different between the right side and the left side of the film. In casting film formation, for example, the flow rate of the binder solution can be differentiated between the right side and the left side by, for example, providing tapers to the die.

In such a process, the polarizer of the present invention is produced with the stretching direction oblique by 10 to 80° to the length direction.

The rubbing method can be conducted according to a usual rubbing treatment method employed widely in a liquid crystal orienting process of LCD. Specifically, the surface of the alignment film is rubbed in one direction with paper, gauze, felt, rubber, fiber of nylon or polyester, or a like material to impart orienting property. Generally, the treatment is conducted by rubbing the film several times with a cloth having fibers of uniform length and diameter transplanted uniformly, or a like material. In the rubbing treatment employed preferably in the present invention, a rubbing roll is used which has circularity, cylindricity, and eccentricity of the roll of 30 μm or less. The wrapping angle of the film to the rubbing roll is preferably in a range of 0.1 to 90°. However, stable rubbing treatment can be achieved by winding the film at an angle of 360° or more as disclosed in JP-A-8-160430. For rubbing of a long film, the film is preferably delivered at a constant tensile force at a rate of 1 to 100 m/min. The rubbing roll is preferably turnable horizontally relative to the film delivery direction for setting a desired rubbing angle, the angle being suitably selected from a range of 0 to 60°, with 45° being preferable. For use as the liquid crystal display, the angle is preferably in a range of 40 to 50°.

Liquid Crystal Display:

The polarizing plate using the cellulose acetate film can advantageously be used for liquid crystal displays, particularly for transmission type liquid crystal displays.

The transmission type liquid crystal display comprises a liquid crystal cell and two polarizing plate placed on the both sides thereof. The liquid crystal cell holds a liquid crystal between two electrode base plates.

The polarizing plate of the present invention can be used as one or both of the above polarizing plates. In this case, the (optically anisotropic) cellulose acetate film of the polarizing plate is placed so as to face the liquid crystal cell.

The liquid crystal cell is preferably of an OCB mode, a VA mode, an ECB mode, or a TN mode.

The liquid crystal cell of the OCB mode is a liquid crystal cell of a bend orientation mode in which the rod-like liquid crystal molecules are oriented to become reverse substantially (symmetrically) in the orientation direction between the top and the bottom of the liquid crystal cell. A liquid crystal display using the liquid crystal cell of the bend orientation mode is disclosed in U.S. Pat. Nos. 4,583,825, and 5,410,422. The liquid crystal cell of the bend orientation mode has self optical compensation function due to the symmetric orientation of the rod-like liquid crystal molecules between the top and the bottom of the liquid cell. Therefore, this liquid crystal mode is called an OCB (optically compensatory bend) crystal liquid mode. The liquid crystal display of the bend orientation mode has an advantage of high response speed.

The polarizing plate of the present invention, which is used in a liquid crystal display of an OCB mode, may have an optically anisotropic layer containing a discotic compound or a rod-like compound on the cellulose acetate film used as the polarizing plate. The optical anisotropic layer is formed by orienting the discotic compound (or the rod-like liquid crystal compound) and fixing the oriented state.

Discotic compounds have generally a higher birefringent index. The discotic compound can take various oriented states. Therefore, by using the discotic compound, a polymer film (optical compensation film) can be produced which has optical properties that cannot be obtained from a conventional stretched birefringent film. The polymer film using the discotic compound is described in JP-A-6-214116, U.S. Pat. Nos. 5,583,679 and 5,646,703, and German Patent 3911620A1.

In the liquid crystal cell of the VA mode, the rod-like liquid crystal molecules orients substantially vertically when not applying voltage.

The liquid crystal cell in the VA mode includes (1) liquid crystal cells in a narrow sense in which rod-like liquid crystal molecules are aligned substantially vertically when not applying voltage and are oriented substantially horizontally when applying voltage (JP-A-2-176625), (2) liquid crystal cells (MVA mode) in which VA mode is formed in multiple domains for visual field angle expansion (SID97, Digest of tech. Papers (Preprint) 28 (1997) 845), (3) liquid crystal cells (n-ASM mode) in which rod-like liquid crystal molecules are oriented substantially vertically when not applying voltage and are oriented in twisted multiple domains when applying voltage (Nippon Ekisho Toronkai (Japan Liquid Crystal Symposium), Preprint 58–59 (1998)), and (4) liquid crystal cells of SURVIVAL mode (presented at LCD International 98).

The ECB mode of the liquid crystal is the oldest of the liquid crystal modes, and is described in many documents.

In the liquid crystal cell of the TN mode, the rod-like liquid crystal molecules are oriented substantially vertically when not applying voltage in a state twisted at an angle of 60 to 120°.

TN mode liquid crystal cells are used most widely, and are described in many documents.

EXAMPLES

The present invention is explained in detail by reference to the following Examples, but it should be understood that the invention is not construed as being limited thereto.

Example 1

Preparation of Polarizer:

A PVA film having an average degree of polymerization of 1700 and a degree of saponification of 99.5 mol % (thickness, 80 μm; width, 2,500 mm) was stretched uniaxially in the vertical direction in warm water at 40° C. at a stretch ratio of 8. The film in this state was immersed in an aqueous solution containing 0.2 g/l of iodine and 60 g/l of potassium iodide at 30° C. for 5 minutes, and then immersed in an aqueous solution containing 100 g/l of boric acid and 30 g/l of potassium iodide. The film in this state had a width of 1,300 mm and a thickness of 17 μm.

The film was then immersed in a water-washing vessel at 20° C. for 10 seconds, and further immersed in an aqueous solution containing 0.1 g/l of iodine and 20 g/l of potassium iodide at 30° C. for 15 seconds. The film was dried at room temperature for 24 hours to obtain an iodine type polarizer (HF-1).

Preparation of Polymer Substrate:

The composition shown below was put into a mixing tank, and the components were dissolved by stirring with heating to prepare a cellulose acetate solution.

Composition of Cellulose Acetate Solution

|  | Parts by mass |
| --- | --- |
| Cellulose acetate (acetic acid content: 60.9%) | 100 |
| Triphenyl phosphate (plasticizer) | 7.8 |
| Biphenyl diphenyl phosphate (plasticizer) | 3.9 |
| Methylene chloride (first solvent) | 300 |
| Methanol (second solvent) | 54 |
| 1-Butanol (third solvent) | 11 |

16 Parts by mass of the retardation-increasing agent shown below, 80 parts by mass of methylene chloride, and 20 parts by mass of methanol were introduced into another mixing tank. The resulting mixture was stirred with heating to prepare a solution of the retardation-increasing agent.

464 Parts by mass of the cellulose acetate solution and 36 parts by mass of the retardation-increasing agent solution were mixed and stirred sufficiently to prepare a dope. The amount of the retardation-increasing agent added was 5.0 parts by mass per 100 parts by mass of cellulose acetate.

Retardation-Increasing Agent

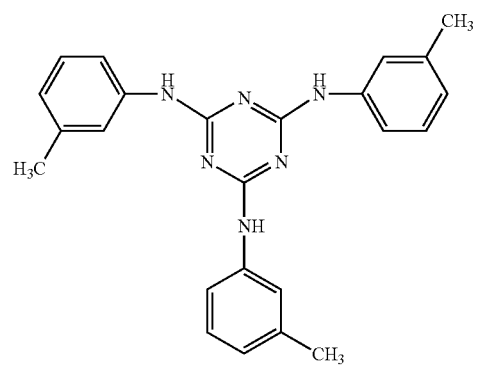

The dope obtained was cast using a band-casting machine. When the film surface temperature had reached 40° C. on the band, the film formed was dried for 1 minute. The film was stripped off from the band, and dried by drying air stream at 140° C. The film was stretched by 28% in the width direction by a tenter, and then dried with a drying air stream at 135° C. for 20 minutes. Thus, a polymer substrate (PK-1) was prepared which contained the residual solvent at a content of 0.3 mass %.

The thus-obtained polymer substrate (PK-1) had a thickness of 92 μm. The retardation value (Re) at 590 nm of the substrate was 43 nm, and the retardation value (Rth) at 590 nm was 175 nm as measured by an ellipsometer (M–150, manufactured by Nippon Bunko K.K.).

The thus-prepared polymer substrate (PK-1) was immersed in a 2.0N potassium hydroxide solution (25° C.) for 2 minutes, then neutralized with sulfuric acid, washed with pure water, and dried. This PK-1 had a surface energy of 63 mN/m, as measured by a contact angle method.

This PK-1 was coated with an alignment film-coating liquid having the composition shown below in an application amount of 28 ml/m² with a #16 wire bar coater. The coated film was dried by warm air stream at 60° C. for 60 seconds and further at 90° C. for 150 seconds.

Composition of Alignment Film Coating Liquid

|  | Parts by mass |
| --- | --- |
| Modified polyvinyl alcohol shown below | 10 |
| Water | 371 |
| Methanol | 119 |
| Glutaraldehyde (crosslinking agent) | 0.5 |

Modified Polyvinyl Alcohol

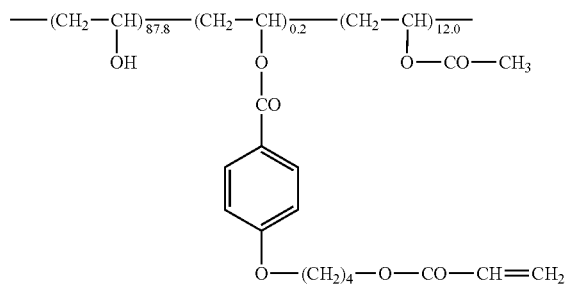

The formed alignment film was subjected to rubbing treatment in a direction of 45' to the phase retardation axis (measured at 632.8 nm) of the polymer substrate (PK-1).

Formation of Optical Anisotropic Layer:

The alignment film was coated with a coating liquid containing 41.01 g of the discotic liquid crystal compound shown below, 4.06 g of ethylene oxide-modified trimethylolpropane triacrylate (V#360, produced by Osaka Yuki Kagaku K.K.), 0.35 g of cellulose acetate butyrate (CAB531-1, produced by Eastman Chemical Co.), 1.35 g of a photopolymerization initiator (Irgacure 907, produced by Ciba Geigy Co.), and 0.45 g of a sensitizer (Kayacure DETX, produced by Nippon Kayaku Co.) dissolved in 102 g of methyl ethyl ketone, by means of a #3 wire bar. The coated film was fixed to a metal frame, and was heated at 130° C. for 2 minutes in a thermostatic oven to orient the discotic liquid crystal compound. The treated film was irradiated with UV for 1 minute at 130° C. by a high pressure mercury lamp of 120 W/cm to polymerize the discotic liquid crystal compound, and was allowed to cool to room temperature. Thus, an optical compensation sheet (KH-1) having an optical anisotropic layer was prepared.

The optical anisotropic layer had a Re retardation value of 38 nm at 546 nm. The angle (inclined angle) between the discotic plane and the first transparent supporting member face was 40° in average.

Discotic Liquid Crystal Compound

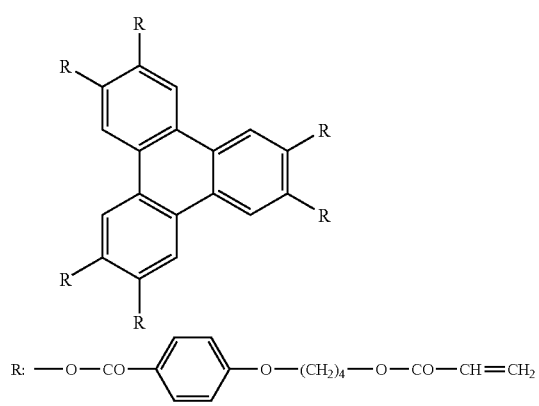

Preparation of Polarizing Plate:

The optical compensation sheet (KH-1) was bonded at the face of the polymer substrate (PK-1) to the one face of the polarizer (HF-1) using a polyvinyl alcohol type adhesive. Separately, 80 μm thick triacetylcellulose film (TD-80U, produced by Fuji Photo Film Co.) was treated for saponification, and this film was bonded to the reverse face of the polarizer.

The transmission axis of the polarizer and the phase retardation axis of the polymer substrate (PK-1) were placed parallel to each other, whereas the transmission axis of the polarizer and the phase retardation axis of the commercial triacetylcellulose film were placed perpendicularly to each other. Thus, a polarizer (HB-1) was prepared.

Example 2

Preparation of Polymer Substrate:

16 parts by mass of the retardation-increasing agent used in Example 1, 80 parts by mass of methylene chloride, and 20 parts by mass of methanol were placed in a mixing tank. The resulting mixture was stirred with heating to prepare a solution of the retardation-increasing agent solution.

474 parts by mass of the cellulose acetate solution prepared in Example 1 and 25 parts by mass of the retardation-increasing agent solution were mixed and stirred sufficiently to prepare a dope. The amount of the retardation-increasing agent added was 3.5 parts by mass per 100 parts by mass of cellulose acetate.

The thus-obtained dope was cast using a band-casting machine. When the film surface temperature had reached 40° C., the formed film was dried for 1 minute. The formed film was stripped off, dried by a drying air stream at 140° C. Thus, a polymer substrate (PK-2) was prepared which contained the residual solvent at a content of 0.3 mass %.

The obtained polymer substrate (PK-2) had a thickness of 65 μm. The retardation value (Re) at 590 nm of the polymer substrate was 8 nm, and the retardation value (Rth) at 590 nm was 78 nm as measured by an ellipsometer (M–150, manufactured by Nippon Bunko K.K.).

Preparation of Optical Compensation Sheet Having Optically Anisotropic Layer:

The polymer substrate (PK-2) was immersed in a 2.0N potassium hydroxide solution (25° C.) for 2 minutes, neutralized with sulfuric acid, washed with pure water, and dried. This PK-2 had a surface energy of 63 mN/m, as measured by a contact angle method.

Formation of Alignment Film:

The prepared PK-2 was coated with the alignment film-coating liquid having the composition shown below in an application amount of 28 mL/m$^2$ with a #16 wire bar coater. The coated film was dried by a warm air stream at 60° C. for 60 seconds and further at 90° C. for 150 seconds.

Composition of Aligning Film Coating Liquid

| | Parts by mass |
|---|---|
| Modified polyvinyl alcohol of Example 1 | 10 |
| Water | 371 |
| Methanol | 119 |
| Glutaraldehyde (crosslinking agent) | 0.5 |

The formed film was subjected to rubbing treatment in a direction parallel to the length direction of PK-2.

Formation of Optically Anisotropic Layer:

The alignment film was coated with a coating liquid containing 41.01 g of the discotic liquid crystal compound used in Example 1, 4.06 g of ethylene oxide-modified trimethylolpropane triacrylate (V#360, produced by Osaka Yuki Kagaku K.K.), 0.90 g of cellulose acetate butyrate (CAB551-0.2, produced by Eastman Chemical Co.), 0.23 g of cellulose acetate butyrate (CAB531-1, produced by Eastman Chemical Co.), 1.35 g of a photopolymerization initiator (Irgacure 907, produced by Ciba Geigy Co.), and 0.45 g of a sensitizer (Kayacure DETX, produced by Nippon Kayaku Co.) dissolved in 102 g of methyl ethyl ketone, by means of #3.6 wire bar. The coated film was heated in a thermostatic zone at 130° C. for 2 minutes to orient the discotic liquid crystal compound. The film thus treated was irradiated with UV for 1 minute at 60° C. by a high pressure mercury lamp of 120 W/cm to polymerize the discotic liquid crystal compound. The film was allowed to cool to room temperature. Thus, an optical compensation sheet (KH-2) having an optically anisotropic layer was prepared.

The optically anisotropic layer had a Re retardation value of 43 nm measured at 546 nm. The angle (inclination angle) between the discotic plane and the first transparent supporting member face was 42° in average.

Preparation of Polarizing Plate:

The optical compensation sheet (KH-2) was bonded to the one face of the polarizer (HF-1) using a polyvinyl alcohol type adhesive. Separately, 80 µm thick triacetylcellulose film (TD-80U, produced by Fuji Photo Film Co.) was treated for saponification, and this film was bonded to the reverse face of the polarizer.

The transmission axis of the polarizer and the phase retardation axis of the polymer substrate (PK-2) were placed parallel to each other, whereas the transmission axis of the polarizer and the phase retardation axis of the commercial triacetylcellulose film were placed perpendicularly to each other. Thus, a polarizing plate (HB-2) was prepared.

Example 3

Preparation of Bend-Alignment Liquid Crystal Cell:

A polyimide film was provided as an alignment film on two glass substrates having an ITO electrode, respectively. The alignment films were subjected to rubbing treatment. Two glass substrates formed in duplication were placed in opposition with the cell gap of 6 µm with the rubbing treatment directions thereof parallel to each other. A liquid crystal compound (ZLI 1132, produced by Merck Co.) having Δn of 0.1396 was injected into the cell gap. Thereby, a bend-alignment liquid crystal cell was produced. The liquid cell had a size of 20 inches.

Two polarizing plates (HB-1) prepared in Example 1 were bonded to the both faces of the above produced bend-alignment cell. In the bonding, the polarizing plates were placed with the optically anisotropic layers facing respectively to the cell substrates with the rubbing-treated directions of the liquid crystal cell and the elliptic polarizing plate kept antiparallel.

A rectangular wave voltage of 55 Hz was applied to the liquid crystal cell in a normally-white mode of white display of 2V and black display of 5V. Taking the transmittance ratio (white display/black display) as the contrast ratio, the visual field angle was measured at 8 steps from black display (L1) to white display (L8) by a tester (EZ-Contrast 160D, manufactured by ELDIM Co.).

The results obtained are shown in Table 1 below.

TABLE 1

| Liquid Crystal | Visual field angle (Range of contrast ratio of 10 or more, and no gradation reversal in black side) | | |
|---|---|---|---|
| Display | Top | Bottom | Right and Left |
| Example 3 | 80° | 80° | 80° |

(Note)
Gradation reversal in black side: Reversal between L1 and L2

Evaluation of Light Leakage:

The backlight was turned on continuously for 5 hours under the environmental conditions of temperature 25° C. and relative humidity 60%. The whole-area black display state was visually examined in a dark room to evaluate the light leakage. As a result, no light leakage was found in the display screen of the liquid crystal display.

Example 4

A pair of polarizing plates were stripped off from a liquid crystal display using. TN type liquid crystal cells (AQUOS LC20C1S, manufactured by Sharp Corp.), and instead thereof, the polarizing plates (HB-2) prepared in Example 2 were bonded thereto, one on the observer's side and another one on the backlight side with the optical compensation sheets (KH-2) facing the liquid cell with an adhesive. The transmission axis of the polarizing plate on the observer's side and the transmission axis of the polarizing plate on the backlight side are placed in an O-mode.

The prepared liquid crystal display was tested for the visual field angle in 8 steps from black display (L1) to white display (L8) with a tester (EZ-Contrast 160D, manufactured by ELDIM Co.). The results obtained are shown in Table 2 below.

Comparative Example 1

A liquid crystal display using TN type liquid crystal cells (AQUOS LC20C1S, manufactured by Sharp Corp.) was tested for the visual field angle in 8 steps from black display (L1) to white display (L8) with a tester (EZ-Contrast 160D, manufactured by ELDIM Co.).

The results obtained are shown in Table 2 below.

TABLE 2

| Liquid Crystal | Visual field angle (Range of contrast ratio of 10 or more, and no gradation reversal reversal in black side) | | |
|---|---|---|---|
| Display | Top | Bottom | Right and Left |
| Example 4 | 75° | 43° | 80° |
| Comparative Example 1 | 70° | 42° | 80° |

(Note)
Gradation reversal in black side: Reversal between L1 and L2

Evaluation of Light Leakage:

The backlight was turned on continuously for 5 hours under the environmental conditions of temperature 25° C. and relative humidity 60%. The whole-area black display state was visually examined in a dark room to evaluate the light leakage. As the results, no light leakage was found in the display screen of the liquid crystal display of Example 4. However, framelike light leakage was observed in the display screen of Comparative Example 1.

Example 5

Preparation of Polymer Film:

16 parts by mass of the retardation-increasing agent used in Example 1, 80 parts by mass of methylene chloride, and 20 parts by mass of methanol were placed in a mixing tank. The mixture was stirred with heating to prepare a retardation-increasing agent solution.

464 parts by mass of the cellulose acetate solution prepared in Example 1 and 36 parts by mass of the retardation-increasing agent solution were mixed and stirred sufficiently to prepare a dope. The amount of the retardation-increasing agent added was 5.0 parts by mass per 100 parts by mass of cellulose acetate.

The obtained dope was cast with a band-casting machine. When the film surface temperature had reached 40° C., the formed film was dried for 1 minute. The formed film was stripped off, and dried by drying air stream at 140° C. The film was stretched by 30% in the width direction with a tenter, and then dried with a drying air stream at 135° C. for about 20 minutes. Thus, a polymer substrate (PK-3) was prepared which contained the residual solvent at a content of 0.3 mass %.

The obtained polymer substrate (PK-3) had a thickness of 102 μm. The retardation value (Re) at 590 nm of the substrate was 47 nm, and the retardation value (Rth) at 590 nm was 153 nm as measured by an ellipsometer (M–150, manufactured by Nippon Bunko K.K.).

Preparation of Polarizing Plate:

The polymer substrate (PK-3) was bonded to one face of the polarizer (HF-1) using a polyvinyl alcohol type adhesive. Separately, 80 μm thick triacetylcellulose film (TD-80U, produced by Fuji Photo Film Co.) was treated for saponification, and this film was bonded to the reverse face of the polarizer.

The transmission axis of the polarizer (HF-1) and the phase retardation axis of the polymer substrate (PK-3) were placed parallel to each other, whereas the transmission axis of the polarizer and the phase retardation axis of the commercial triacetylcellulose film were placed perpendicularly to each other. Thus, a polarizer (HB-3) was prepared.

Vertical Alignment Liquid Crystal Cell:

A pair of polarizing plates and a pair of retardation films were stripped off from a liquid crystal display using a vertical alignment liquid crystal cells (VL-1530S, manufactured by Fujitsu Ltd.), and instead thereof, the respective polarizing plates (HB-3) were bonded thereto with the polymer substrate (PK-3) facing the liquid cell side with interposition of an adhesive. The transmission axis of the polarizing plate on the observer's side is directed vertically and the transmission axis of the polarizing plate on the backlight side is placed laterally in a cross-nicol arrangement.

The prepared liquid crystal display was tested for the visual field angles for 8 steps from black display (L1) to white display (L8) with a tester (EZ-Contrast 160D, manufactured by ELDIM Co.). The results obtained are shown in Table 3 below.

Comparative Example 2

The liquid crystal display using a vertical alignment liquid crystal cells (VL-1530S, manufactured by Fujitsu Ltd.) was tested for the visual field angles for 8 steps from black display (L1) to white display (L8) with a tester (EZ-Contrast 160D, manufactured by ELDIM Co.). The results obtained are shown in Table 3 below.

TABLE 3

| Liquid Crystal Display | Visual field angle (Range of contrast ratio of 10 or more, and no gradation reversal in black side) | |
|---|---|---|
| | Transmission axis direction | 45° from transmission axis direction |
| Example 4 | >80° | >80° |
| Comparative Example 1 | >80° | 44° |

(Note)
Gradation reversal in black side: Reversal between L1 and L2

Evaluation of Light Leakage

The backlight was turned on continuously for 5 hours under the environmental conditions of temperature 25° C. and relative humidity 60%. Thereafter the whole-area black display state was visually examined in a dark room to evaluate the light leakage. As a result, no light leakage was found in the display screen of the liquid crystal display of Example 5. However, framelike light leakage was observed in the display screen of Comparative Example 2.

Example 6

PVA having an average degree of polymerization of 4000 and a degree of saponification of 99.8% was dissolved in water to obtain a 4.0% aqueous solution thereof. This solution was cast through a tapered die onto a casting band, and dried to obtain a film having a width of 110 mm, and a thickness of 120 μm at the left end and 135 μm at the right end before stretching.

This film was stripped off from the casting band, and was stretched obliquely at an angle of 45° in dry conditions. The film in this state was immersed in an aqueous solution containing iodine (0.5 g/l) and potassium iodide (50 g/l) at 30° C. for 1 minute, and then immersed in an aqueous solution containing boric acid (100 g/l) and potassium iodide (60 g/l) at 70° C. for 5 minutes. The film was washed with water in a water washing vessel at 20° C. for 10 seconds, and dried at 80° C. for 5 minutes to obtain an iodine type polarizer (HF-4). The polarizer had a width of 660 mm and a thickness of 20 μm at both of the right and left edges.

A polarizing plate (HB-4) was prepared in the same manner as in the preparation of the polarizing plate in Example 2 except that the polarizer (HF-4) was used in place of the polarizer (HF-1).

Example 7

PVA having an average degree of polymerization of 2500 and a degree of saponification of 99.5% was dissolved in water to obtain a 50% aqueous solution. This solution was cast through a die with a taper on a casting band, and dried to obtain a film having a width of 300 mm, and a thickness of 100 μm at the left end and 115 μm at the right end before stretching.

This film was stripped off from the casting band, and the film in this state was immersed in an aqueous solution containing iodine (0.2 g/l) and potassium iodide (60 g/l) at 30° C. for 5 minutes. The film was immersed in an aqueous solution containing boric acid (100 g/l) and potassium iodide (30 g/l) with stretching in an oblique direction at an angle of 45° at 60° C. for 10 minutes. The film had a width of 1,900 mm and a thickness of 15 μm at both of the right and left edges.

The film was immersed in a water washing vessel at 20° C. for 10 seconds, and further immersed in an aqueous solution containing iodine (0.1 g/l) and potassium iodide (30 g/l) at 30° C. for 15 seconds. The film was dried at room temperature for 24 hours to obtain an iodine type polarizer (HF-5).

A polarizing plate (HB-5) was prepared in the same manner as in the polarizing plate in Example 2 except that the polarizer (HF-5) was used in place of the polarizer (HF-1).

Evaluation of Production Yield of Polarizing Plate:

The number of sheets having a size of 219.0×291.4 mm which could be punched out from the polarizing sheet was measured. The size of the polarizing plate was 650 mm in width and 1000 mm in length in correspondence with Comparative Example 1.

From the polarizing plates of Examples 6 and 7, nine sheets could be punched out for 14.1-inch LCD. This yield is much higher than the yield of six sheets of commercial polarizing plates.

Examples 8 and 9

The polarizing plates of Examples 6 and 7 were evaluated for the visual field angle and the marginal irregularity in the same manner as in Example 4 except that the polarizing plate of example 6 or 7 (HB-4 or HB-5) was used in place of the polarizing plate (HB-2). Both of the polarizing plates were excellent.

Example 10

A polarizing plate (HB-6) was prepared in the same manner as in Example 2 except that the polymer substrate (PK-2) was replaced by a polymer substrate (PK-4) having a thickness of 80 μm and adjusted to have the same retardation value.

The polarizing plate was evaluated for the visual field angle and the marginal irregularity in the same manner as in Example 4 except that the polarizing plate (HB-6) was used in place of the polarizing plate (HB-2). The polarizing plate (HB-6) caused much less marginal irregularity than that of Comparative Example 1 and was excellent, but caused slight marginal irregularity in comparison with the polarizing plate (HB-2). Thereby, it was confirmed that the polymer substrate is preferably thinner. The visual field angle was excellent.

INDUSTRIAL APPLICABILITY

The present invention enables optical compensation of an optical cell without adverse effect, and suppression of marginal increase of transmission, by the use of a polarizing plate comprising a polarizer having a thickness of 10–25 μm and an optically anisotropic layer comprising a liquid crystal compound.

Further, the production yield of the polarizing plate could be remarkably improved by providing a large polarizing plate in which a transmission axis is present neither in the length nor in the breadth direction.

The invention claimed is:

1. A polarizing plate comprising a polymer film, a polarizer, a polymer substrate, and an optically anisotropic layer comprising a liquid crystal compound, laminated in this order, wherein the polarizer has a thickness of 10 to 25 μm.

2. The polarizing plate as claimed in claim 1, wherein the polymer substrate has a thickness of 30 to 70 μm.

3. The polarizing plate as claimed in claim 1, wherein the polarizer has a thickness of 10 to 20 μm.

4. The polarizing plate as claimed in claim 1, wherein the polymer comprises cellulose acetate.

5. The polarizing plate as claimed in claim 1, wherein the polymer substrate comprises cellulose acetate.

6. The polarizing plate as claimed in claim 1, wherein the liquid crystal compound used in the optical anisotropic layer is a discotic liquid crystal compound, the plane of the discotic structural units is inclined relative to the surface of the polymer substrate, and the angle between the plane of the discotic structural units and the surface of the polymer substrate changes in the direction of the depth of the optically anisotropic layer.

7. A liquid crystal display comprising a liquid crystal cell, and two polarizing plates placed on both faces of the liquid crystal cell, wherein at least one of the polarizing plates is the polarizing plate as claimed in claim 1.

8. The liquid crystal display as claimed in claim 7, wherein the liquid crystal cell is of an OCB mode, a VA mode, or a TN mode.

9. A polarizing plate comprising a protective film, a polarizer, and a poly film substrate, laminated in this order, wherein the polarizer has a thickness of 10 to 25 μm, and the polymer film has a Re retardation value defined by the following formula (I) in a range of 20 to 70 nm, a Rth retardation value defined by the following formula (II) in a range of 70 to 400 nm:

$$Re = (nx - ny) \times d \qquad (I)$$

$$Rth = [(nx + ny)/2 - nz] \times d \qquad (II)$$

wherein nx and ny are refractive indexes of a slow axis and a fast axis in plane of the polymer film substrate, and nz is a refractive index of a thickness direction of the polymer film substrate.

* * * * *